(12) United States Patent
Lin et al.

(10) Patent No.: US 10,372,861 B2
(45) Date of Patent: Aug. 6, 2019

(54) METHOD OF MACRO PLACEMENT AND A NON-TRANSITORY COMPUTER READABLE MEDIUM THEREOF

(71) Applicants: NCKU Research and Development Foundation, Tainan (TW); Himax Technologies Limited, Tainan (TW)

(72) Inventors: Chia-Min Lin, Tainan (TW); Te-Wei Peng, Tainan (TW); Fa-Ta Chen, Tainan (TW); Chia-Ching Huang, Tainan (TW)

(73) Assignees: NCKU Research and Development Foundation, Tainan (TW); Himax Technologies Limited, Tainan (TW)

(*) Notice: Subject to any disclaimer, the term of this patent is extended or adjusted under 35 U.S.C. 154(b) by 415 days.

(21) Appl. No.: 15/362,700

(22) Filed: Nov. 28, 2016

(65) Prior Publication Data

US 2018/0150583 A1 May 31, 2018

(51) Int. Cl.
*G06F 17/50* (2006.01)
(52) U.S. Cl.
CPC ...... *G06F 17/5072* (2013.01); *G06F 2217/12* (2013.01); *Y02P 90/265* (2015.11)
(58) Field of Classification Search
USPC .......................................................... 716/124
See application file for complete search history.

(56) References Cited

U.S. PATENT DOCUMENTS

| 2006/0190889 A1* | 8/2006 | Cong ................. G06F 17/5072 716/122 |
| 2007/0157146 A1* | 7/2007 | Chen ................. G06F 17/5072 257/798 |
| 2014/0075404 A1 | 3/2014 | Chuang et al. |

FOREIGN PATENT DOCUMENTS

| TW | 201017458 A | 5/2010 |
| TW | 201019152 A | 5/2010 |
| TW | 201520802 A | 6/2015 |

OTHER PUBLICATIONS

Office Action dated Aug. 23, 2017 in corresponding Taiwan Patent Application No. 105142317.

* cited by examiner

*Primary Examiner* — Eric D Lee
(74) *Attorney, Agent, or Firm* — Donald E. Stout; Stout, Uxa & Buyan, LLP

(57) ABSTRACT

A method of macro placement includes partitioning an entire region of a semiconductor chip into sub-regions; determining a packing sequence of a plurality of movable macros in the sub-region; extracting search points of a plurality of placed blocks in the sub-region with respect to one of the movable macros; determining a feasible region associated with the search point; packing said movable macro in the feasible region; evaluating a legalizing cost function; and determining whether a value of the evaluated legalizing cost function is less than a predetermined threshold value.

16 Claims, 10 Drawing Sheets

41

41

41

METHOD OF MACRO PLACEMENT AND A NON-TRANSITORY COMPUTER READABLE MEDIUM THEREOF

BACKGROUND OF THE INVENTION

1. Field of the Invention

The present invention generally relates to electronic design automation, and more particularly to a method of macro placement.

2. Description of Related Art

Electronic design automation (EDA) is a tool for designing an integrated circuit. Chip designers use the EDA tool to design and analyze a semiconductor chip. Placement is an essential step in EDA to assign locations for various circuit components such as macros within chip area. To ensure performance demands, a placer must optimize some criteria such as total wirelength, timing, congestion, power and placement runtime.

Conventional EDA placement methods cannot efficiently handle floating preplaced macros that are not abutted to a chip outline or cannot connect to a chip outline through preplaced macros. Further, the conventional EDA placement methods are not capable of handling a large number of (e.g., more than ten) macros. Macro placement problem becomes worse when there exist many preplaced macros and/or floating preplaced macros.

For the reasons that conventional EDA placement methods cannot perform effectively, a need has arisen to propose a novel macro legalizer that can efficiently handle floating preplaced macros and large number of preplaced macros.

SUMMARY OF THE INVENTION

In view of the foregoing, it is an object of the embodiment of the present invention to provide a method of macro placement and a macro legalizer that may be adapted to efficiently and effectively placing macros for a large-scale design with reduced runtime.

According to one embodiment, a method of macro placement includes partitioning an entire region of a semiconductor chip into sub-regions; determining a packing sequence of a plurality of movable macros in the sub-region; extracting search points of a plurality of placed blocks in the sub-region with respect to one of the movable macros; determining a feasible region associated with the search point; packing said movable macro in the feasible region; evaluating a legalizing cost function; and determining whether a value of the evaluated legalizing cost function is less than a predetermined threshold value.

DETAILED DESCRIPTION OF THE INVENTION

Figure 1A:
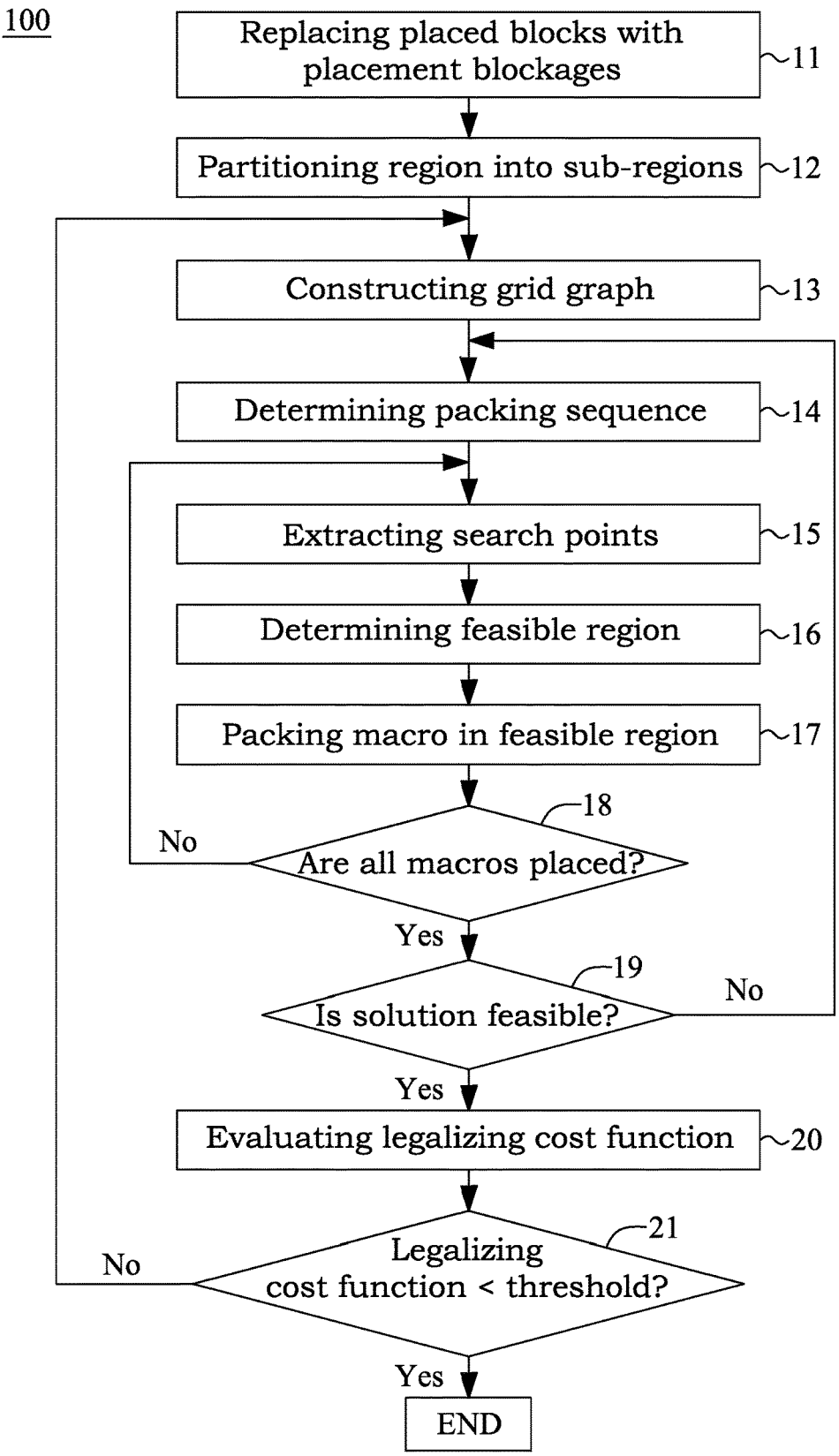
FIG. 1A shows a flow diagram illustrated of a method of macro placement according to one embodiment of the present invention.

FIG. 1A shows a flow diagram illustrated of a method 100 of macro placement according to one embodiment of the present invention. The method 100 of the embodiment may be adapted to a macro placer or macro legalizer that assigns macros to positions on a chip in order to prevent overlap among macros. The method 100 of the embodiment may be performed, for example, by a computer caused by program instructions contained in a non-transitory computer readable medium.

Figure 2A:
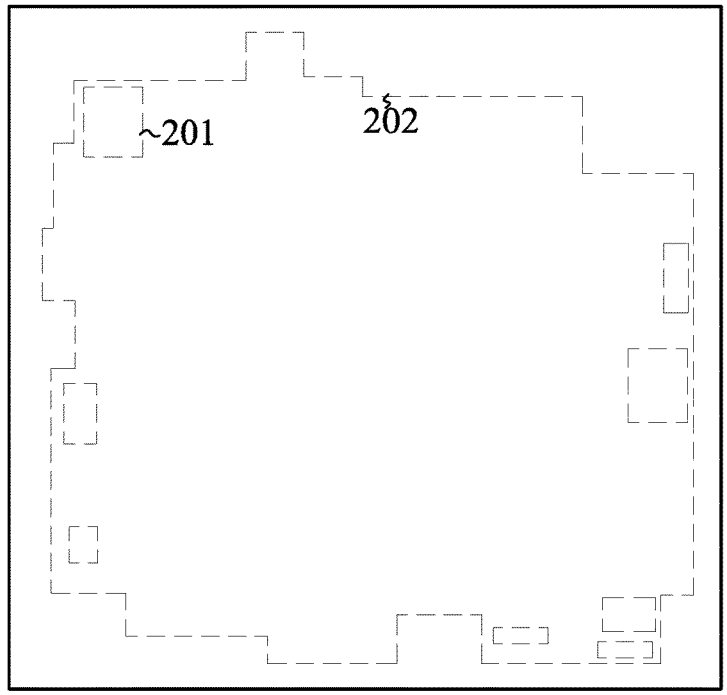
FIG. 2A shows an exemplary region of a semiconductor chip with placed blocks.
Figure 2B:
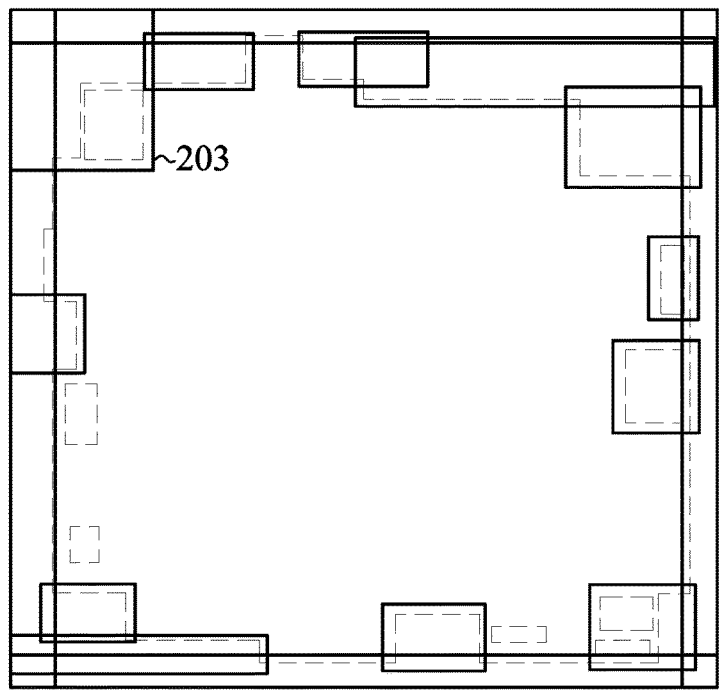
FIG. 2B exemplifies adding placement blockages that cover the placed blocks.
Figure 2C:
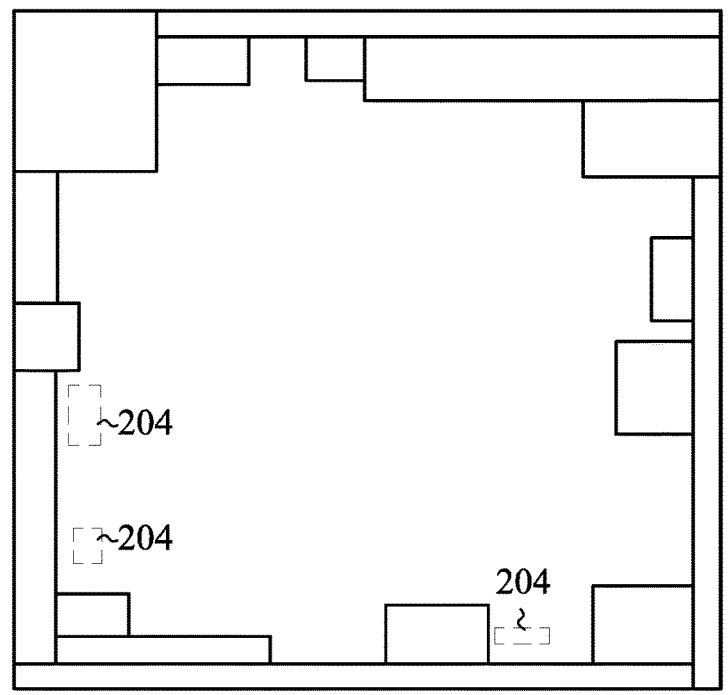
FIG. 2C shows resultant region after combing and dividing the placement blockages.

In step 11, for an entire region of a semiconductor chip, one or more placed blocks, if any, are replaced with one or more placement blockages. FIG. 2A shows an exemplary region 200 of a semiconductor chip with placed blocks such as floating placed blocks 201 and non-floating placed blocks 202. FIG. 2B exemplifies adding placement blockages 203 that cover the placed blocks. The placement blockages 203 generally overlap and have rectangular shape. The placement blockages 203 are combined and then divided into non-overlap (rectangular) blockages. FIG. 2C shows resultant region 200 after combining and dividing the placement blockages 203. It is noted that some placed blocks, for example the placed block 204, may not be covered by the placement blockages 203, and thus may not be replaced with the placement blockage 203.

Figure 3A:
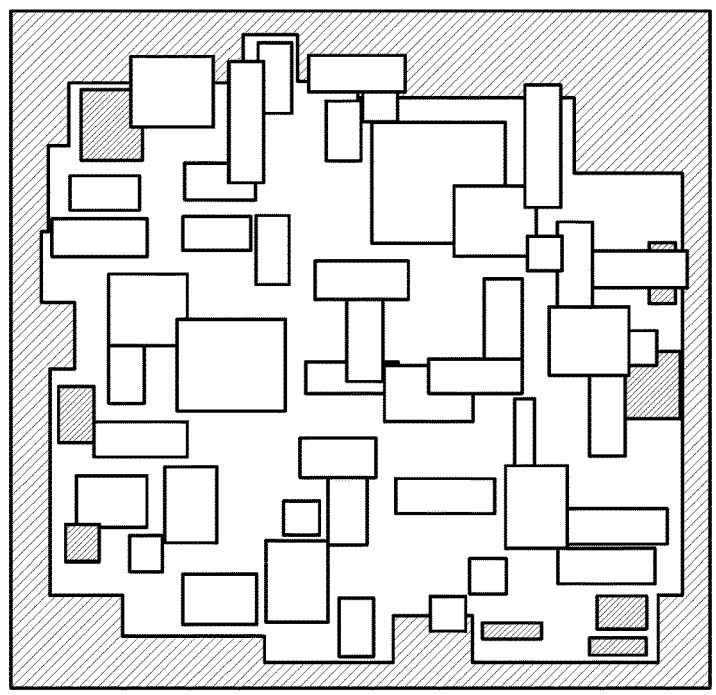
FIG. 3A and FIG. 3B exemplify the entire region with placed blocks and movable macros before and after partition, respectively.
Figure 3B:
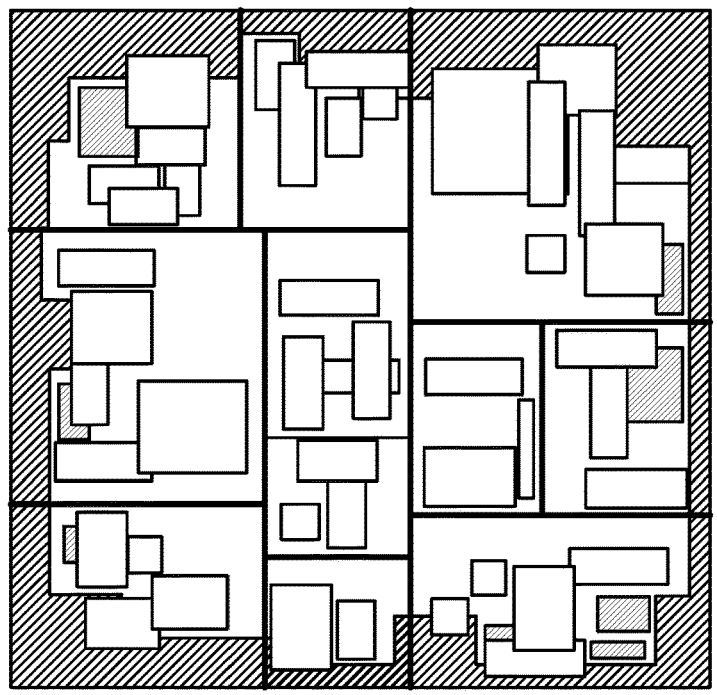

Subsequently, in step 12, the entire region of the semiconductor chip is partitioned into sub-regions. FIG. 3A and FIG. 3B exemplify the entire region 200 with placed blocks (depicted with slant lines) and movable macros (depicted without slant lines) before and after partition, respectively. In the embodiment, partitioning may be performed based on utilization constraints as disclosed in "MAPLE: Multilevel Adaptive Placement for Mixed-Size Designs," entitled to Myung-Chul Kim et al., Proceedings of the 2012 ACM international symposium on International Symposium on Physical Design, pp. 193-200, the disclosure of which is incorporated herein by reference. Specifically speaking, the embodiment performs partitioning according to centers of gravity of the sub-region, empty area of the sub-region, and the movable macros of the sub-region, respectively. Generally speaking, the partitioned sub-regions are different in size as exemplified in FIG. 3B. The following steps of the method 100 are performed to process a partitioned sub-region. Other sub-regions may be similarly processed by the same flow of the method 100.

Figure 4A:
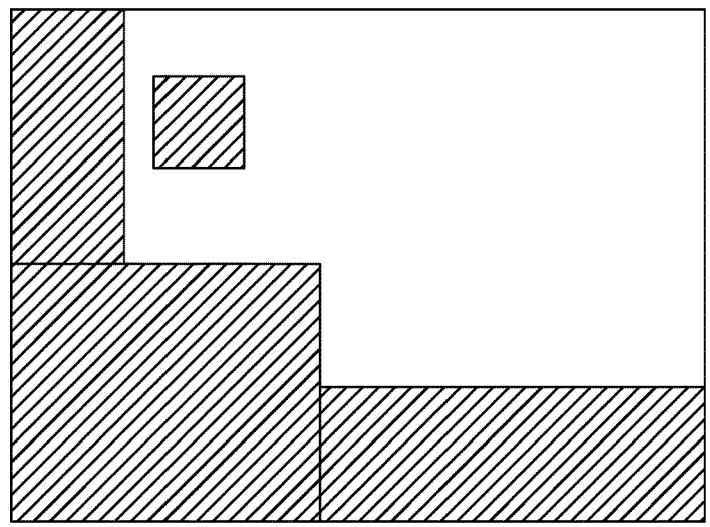
FIG. 4A shows an exemplary sub-region with four placed blocks.
Figure 4B:
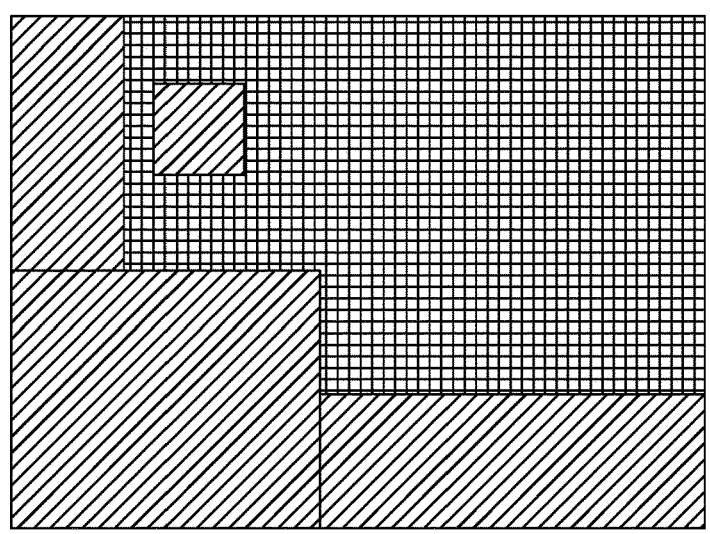
FIG. 4B shows a grid graph associated with the sub-region of FIG. 4A.

In step 13, a grid graph is constructed to record feasible placement locations in a sub-region. In one embodiment, the value of a grid is "1" if the grid is covered by a placed block, otherwise the value is "0". FIG. 4A shows an exemplary sub-region 41 with four placed blocks depicted with slant lines. FIG. 4B shows a grid graph associated with the sub-region 41 of FIG. 4A, in which the value of a grid is "1" (depicted with slant lines) if the grid is covered by a placed block, otherwise the value is "0" (depicted without slant lines).

Figure 5:
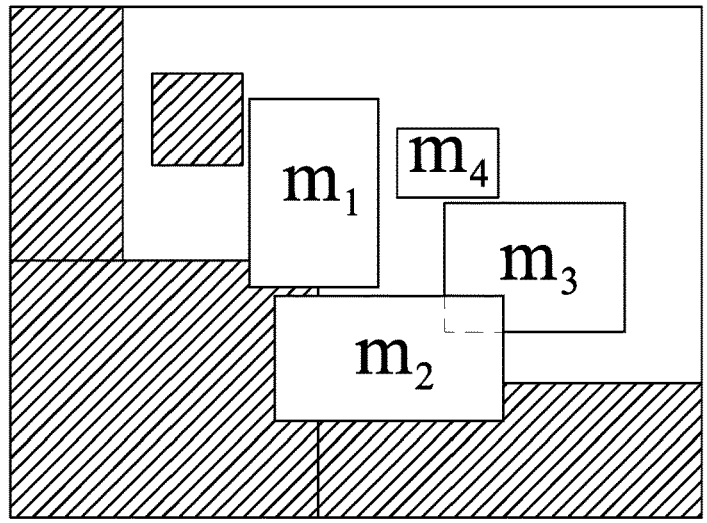
FIG. 5 exemplifies four movable macros, whose packing sequence need be determined, in the sub-region of FIG. 4A.

In step 14, it determines a packing sequence of a plurality of movable macros. FIG. 5 exemplifies four movable macros $m_1$, $m_2$, $m_3$ and $m_4$, whose packing sequence need be determined, in the sub-region 41 of FIG. 4A. In the embodiment, the packing sequence of the movable macros is determined by sorting the movable macros according to values computed by a packing cost function. In one exemplary embodiment, the packing sequence of the movable macros is determined according to areas, locations and aspect ratios of the macros. In the example, the packing cost function for movable macros $m_i$s may be expressed as follows:

$$\text{cost}(m_i) = \alpha a_i + \beta l_i + \gamma t_i$$

where $a_i$ is an area of the macro $m_i$, $l_i$ is a reciprocal of a distance between the macro $m_i$'s initial location and a bottom-left point of a sub-region, $t_i$ is an aspect ratio of the macro $m_i$, $\alpha$, $\beta$ and $\gamma$ are corresponding weightings.

In the embodiment, the bottom-left point is taken as an origin of the sub-region. The x-coordinate of a point increases when the point moves forward (i.e., rightward) horizontally, and the y-coordinate of a point increases when the point moves forward (i.e., upward) vertically. The movable macro with larger value of the packing cost function is processed with higher priority. With respect to the example shown in FIG. 5, the packing sequence Q of the macros $m_1$, $m_2$, $m_3$ and $m_4$ may be Q={$m_2$, $m_3$, $m_1$, $m_4$}. Thereafter, the followings steps (e.g., steps 15-17) would be performed in the order denoted in the packing sequence Q.

In step 15, search points of all placed blocks are extracted. In the specification, the "search point" refers to a probable location where a movable macro may be disposed. In the embodiment, for every placed block, two opposite points of the placed block are extracted, and further two points that are projections of the two opposite points are also extracted. Specifically speaking, for every placed block, four search points $S_1$, $S_2$, $S_3$ and $S_4$ are extracted as follows:

$S_1$: a top-left point of the placed block;
$S_2$: the point which is projection of $S_1$ on a boundary of a neighboring placed block or a boundary of a sub-region when facing left;
$S_3$: a bottom-right point of the placed block; and
$S_4$: the point which is projection of $S_3$ on a boundary of a neighboring placed block or a boundary of the sub-region when facing down.

Figure 6A:
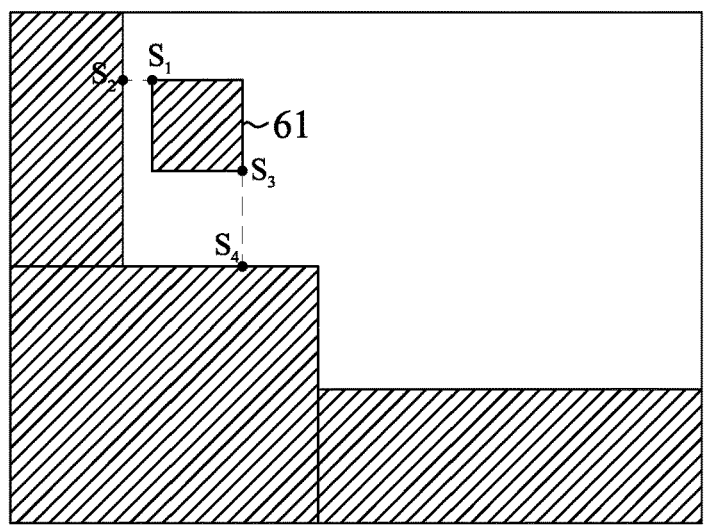
FIG. 6A shows exemplary search points extracted from a placed block.
Figure 6B:
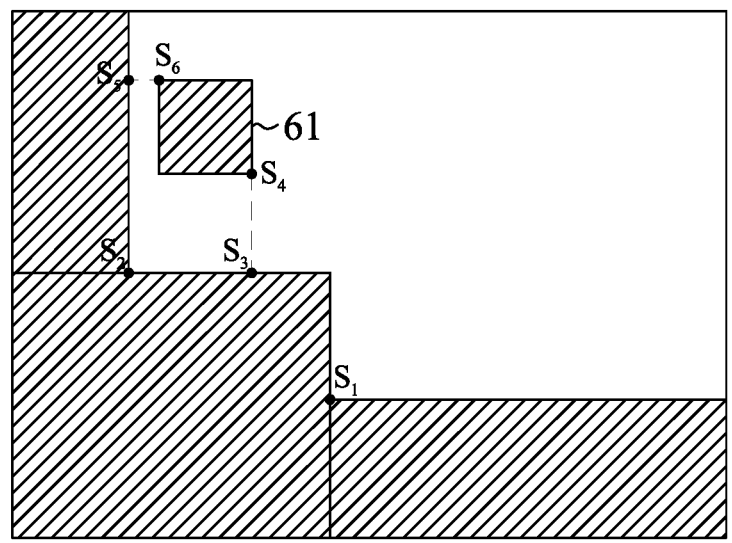
FIG. 6B shows sorted (and renumbered) search points of all placed blocks of FIG. 6A.

Subsequently, the extracted search points of all placed blocks are sorted according to their locations first in a bottom-to-top order, and then a left-to-right order. FIG. 6A shows exemplary search points extracted from a placed block 61. FIG. 6B shows sorted (and renumbered) search points of all placed blocks of FIG. 6A.

Figure 1B:
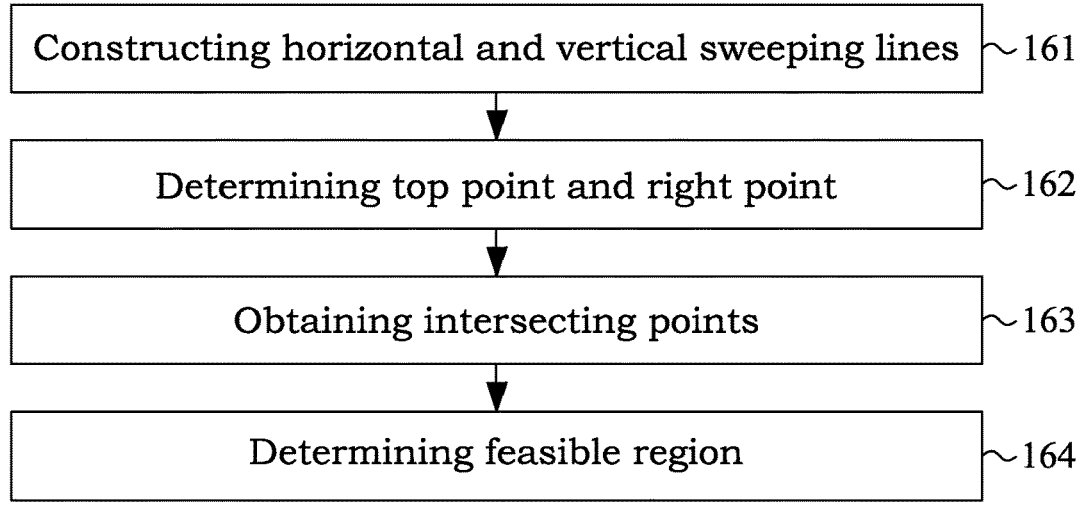
FIG. 1B shows a detailed flow diagram illustrated of step 16 of FIG. 1A.

In step 16, it determines a feasible region associated with the search point such that the macro may be placed in the determined feasible region. FIG. 1B shows a detailed flow diagram illustrated of step 16 of FIG. 1A. It is appreciated that the order in performing the steps may be modified. For example, step 161 may be performed before, after or concurrently with step 162.

Figure 7A:
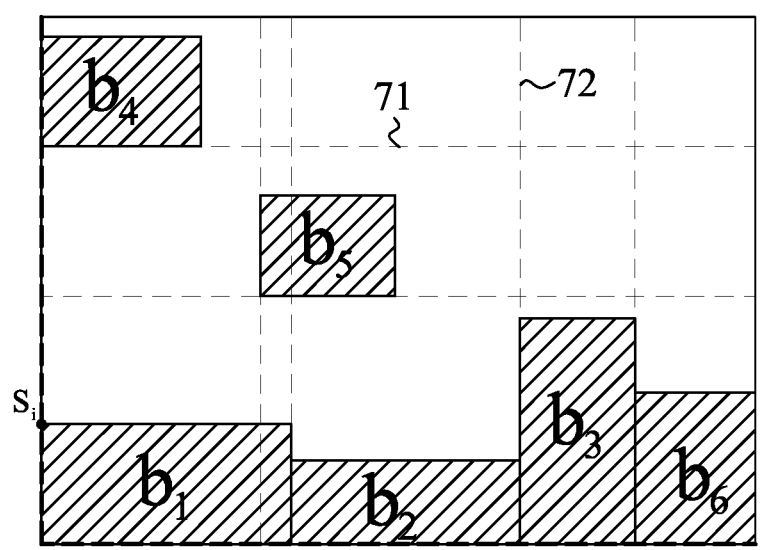
FIG. 7A shows exemplary horizontal sweeping lines and vertical sweeping lines in a sub-region having six placed blocks.

In step 161, it constructs at least one horizontal sweeping line that passes through lower (or first) boundary edge of every placed block and is across the sub-region horizontally. Likewise, it constructs at least one vertical sweeping line that passes through left (or second) boundary edge of every placed block and is across the sub-region vertically. FIG. 7A shows exemplary horizontal sweeping lines 71 and vertical sweeping lines 72 in a region having six placed blocks $b_1$ to $b_6$.

Figure 7B:
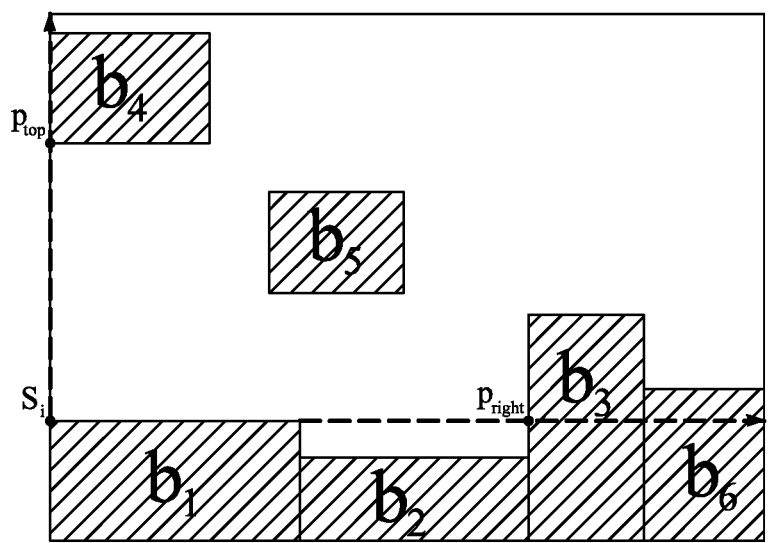
FIG. 7B shows a top point and a right point associated with a search point of FIG. 7A.

In step 162, given a search point, it moves forward (i.e., upward) until being obstructed by a placed block, where the y-coordinate, along with the x-coordinate of the search point denote a location of a top (or first) point. If no obstacle is met while moving the search point upward, the y-coordinate of the boundary of the sub-region, along with the x-coordinate of the search point denote a location of the top point. Likewise, the search point moves forward (i.e., rightward) until being obstructed by a placed block, where the x-coordinate, along with the y-coordinate of the search point denote a location of a right (or second) point. If no obstacle is met while moving the search point rightward, the x-coordinate of the boundary of the sub-region, along with the y-coordinate of the search point denote a location of the right point. It is noted that the top point and the right point, as two opposite points, define a maximum (rectangular) region, in which a feasible region associated with the search point may be determined later. FIG. 7B shows a top point $P_{top}$ and a right point $P_{right}$ associated with a search point $S_i$ of FIG. 7A.

Figure 7C:
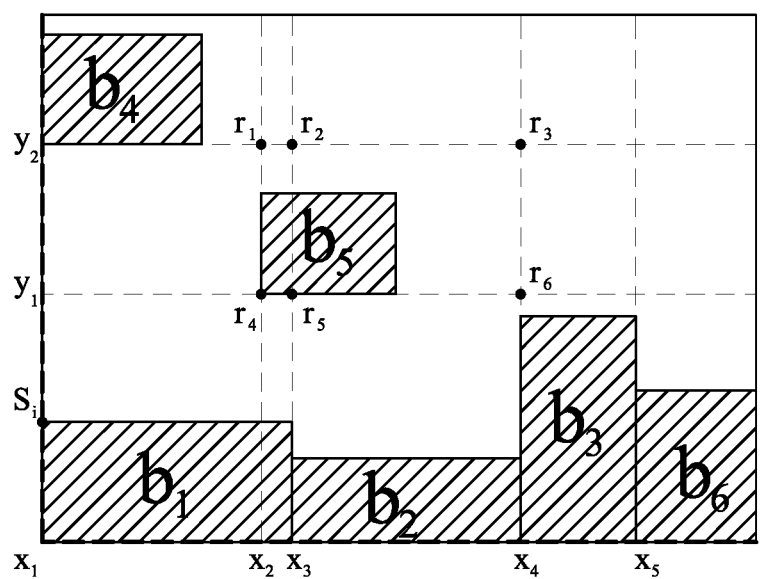
FIG. 7C shows intersecting points within the maximum region defined by the top point and the right point of FIG. 7B.

In step 163, within the maximum region defined by the top point and the right point, intersecting points of the horizontal sweeping lines and the vertical sweeping lines, but excluding those having the same y-coordinate or x-coordinate as the search point, are obtained. FIG. 7C shows intersecting points $r_1$ to $r_6$ within the maximum region defined by the top point $P_{top}$ and the right point $P_{right}$ of FIG. 7B. In the embodiment, the intersecting points are sorted according to their locations first in a top-to-bottom order, and then a left-to-right order.

In step 164, it determines feasible regions defined by the search point and the intersecting points respectively, without .15 encountering a placed block. Still referring to FIG. 7C, it is observed that the regions defined by the search point $S_i$ and the intersecting points $r_2$ and $r_3$ respectively encounter a placed block $b_5$, and those regions should be discarded. Moreover, a smaller region that is a subset of a larger region should also be discarded. Still referring in FIG. 7C, the smaller regions defined by the search point $S_i$ and the intersecting points $r_4$ and $r_5$ respectively are subsets of a larger region defined by the search point $S_i$ and the intersecting point $r_6$, and therefore those smaller regions should be discarded. As a result, two feasible regions defined by the search point $S_i$ and the intersecting points $r_1$ and $r_6$ respectively are obtained.

Figure 8A:
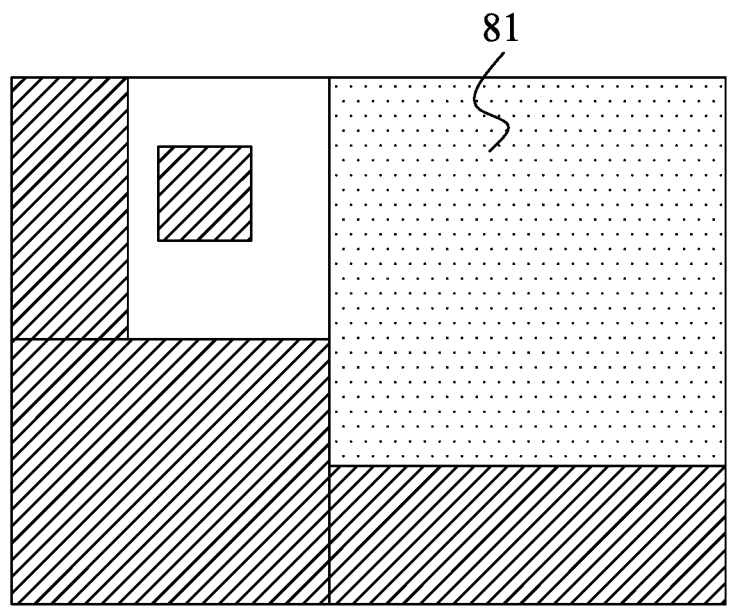
FIG. 8A shows an exemplary feasible region.
Figure 8B:
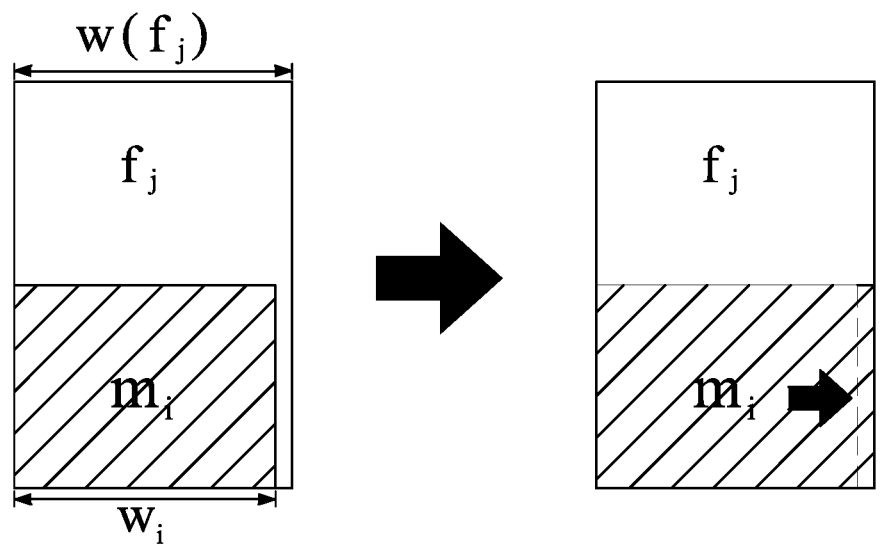
FIG. 8B exemplifies lengthening a macro while packing the macro in a feasible region.

Referring back to FIG. 1A, in step 17, the macro may be packed in the feasible region determined in step 16. FIG. 8A shows an exemplary feasible region 81, where the macro may be packed. It is noted that a width and/or a height of the macro may be adjustably lengthened such that no narrow channel is generated after packing the macro. By the way, such adjustment may reduce unnecessary search for other macros. FIG. 8B exemplifies lengthening a macro $m_i$ (with width $W_i$) while packing the macro $m_i$ (with width $W(f_j)$) in a feasible region $f_j$.

Steps 15-17 as discussed above are repeatedly performed for every macro. When all macros have been placed (step 18), the flow goes to step 19 to determine whether the place solution is feasible. For example, step 18 determines whether the macro is placed well within the sub-region. If the solution is not feasible, the flow goes back to step 14, otherwise the flow goes to step 20. In step 20, a legalizing cost function is evaluated. In the embodiment, the legalizing cost function may be expressed as follows:

$$\text{cost}(s) = \theta O + \mu D + \omega T + \delta C + \varepsilon W$$

where O is a total area of overlaps between any two macros, D is a total displacement of macros, T is a thickness of placed macros in a sub-region, C is a deadspace, W is a half-perimeter wirelength (HPWL), $\theta$, $\mu$, $\omega$, $\delta$ and $\varepsilon$ are weightings.

Figure 9A:
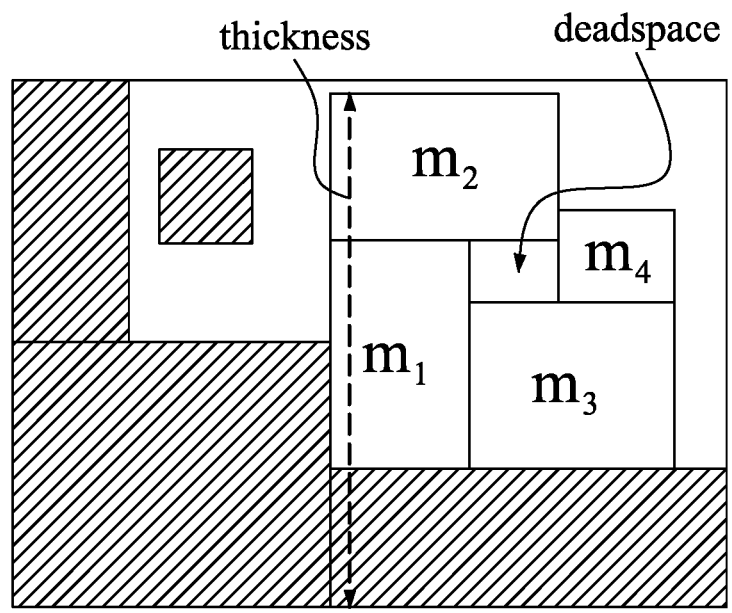
FIG. 9A exemplifies one solution that places macros in a sub-region of FIG. 5.
Figure 9B:
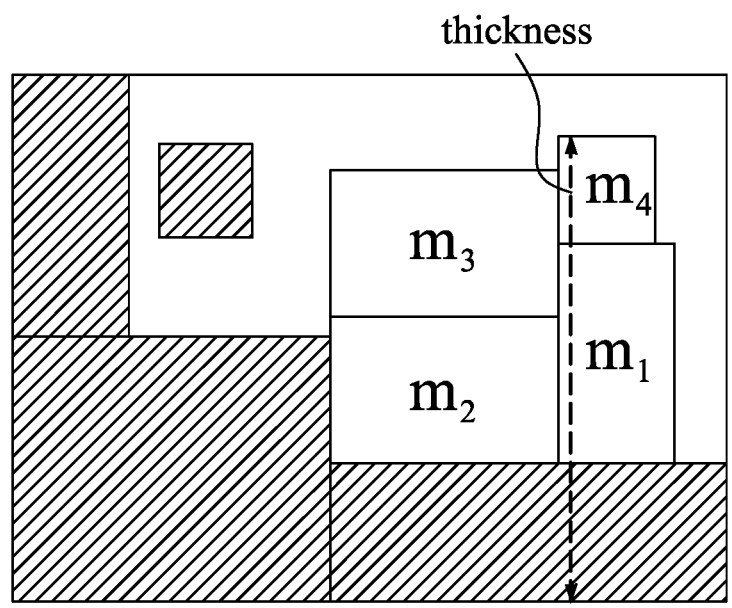
FIG. 9B exemplifies an alternative solution that places macros in the sub-region of FIG. 5.

FIG. 9A exemplifies one solution that places macros $m_1$-$m_4$ in a sub-region of FIG. 5. In this solution, a deadspace is generated. FIG. 9B exemplifies an alternative solution that places macros $m_1$-$m_4$ in the sub-region of FIG. 5. In this alternative solution, the thickness of the placed macros $m_1$-$m_4$ is less than the thickness of the placed macros $m_1$-$m_4$ of FIG. 9A, and no deadspace is generated.

Subsequently, in step 21, it determines whether the value of the legalizing cost function is less than a predetermined threshold value. If the determination is positive, the flow stops as optimized legalization has been achieved; otherwise the flow goes back to step 13.

Although specific embodiments have been illustrated and described, it will be appreciated by those skilled in the art that various modifications may be made without departing from the scope of the present invention, which is intended to be limited solely by the appended claims.

What is claimed is:

1. A method of macro placement, comprising:
   partitioning an entire region of a semiconductor chip into sub-regions;
   determining a packing sequence of a plurality of movable macros in one sub-region of the sub-regions;
   extracting search points of a plurality of placed blocks in the sub-region with respect to one of the movable macros;
   determining a feasible region associated with one search point of the extracted search points;
   packing said movable macro in the feasible region;
   evaluating a legalizing cost function; and
   determining whether a value of the evaluated legalizing cost function is less than a predetermined threshold value;
   wherein for every one of the placed blocks, two opposite points of the placed block are extracted, and two points that are projections of the two opposite points are further extracted.

2. The method of claim 1, wherein the packing sequence of the movable macros is determined by sorting the movable macros according to areas, locations and aspect ratios of the movable macros.

3. The method of claim 1, wherein the packing sequence of the movable macros is determined by sorting the movable macros according to values computed by a packing cost function expressed as follows:

$$\text{cost}(m_i) = \alpha a_i + \beta l_i + \gamma t_i$$

where $a_i$ is an area of the movable macro $m_i$, $l_i$ is a reciprocal of a distance between the movable macro $m_i$'s initial location and a bottom-left point of the sub-region, $t_i$ is an aspect ratio of the movable macro $m_i$, $\alpha$, $\beta$ and $\gamma$ are corresponding weightings.

4. The method of claim 1, wherein four search points $S_1$, $S_2$, $S_3$ and $S_4$ for the placed block are extracted as follows:
   $S_1$: a top-left point of the placed block;
   $S_2$: a point which is projection of $S_1$ on a boundary of a neighboring placed block or a boundary of the sub-region when facing left;
   $S_3$: a bottom-right point of the placed block; and
   $S_4$: a point which is projection of $S_3$ on a boundary of a neighboring placed block or a boundary of the sub-region when facing down.

5. The method of claim 4, wherein the extracted search points of the placed blocks are sorted according to their locations first in a bottom-to-top order, and then a left-to-right order.

6. The method of claim 1, wherein the step of determining the feasible region comprises:
   constructing at least one horizontal sweeping line that passes through a first boundary edge of every placed block and is across the sub-region horizontally;
   constructing at least one vertical sweeping line that passes through a second boundary edge of every placed block and is across the sub-region vertically;
   said search point moving forward vertically until being obstructed by a placed block, resulting in a first point;
   said search point moving forward horizontally until being obstructed by a placed block, resulting in a second point;
   obtaining intersecting points of the horizontal sweeping lines and the vertical sweeping lines within a region defined by the first point and the second point; and
   determining the feasible region defined by said search point and the intersecting point without encountering a placed block.

7. The method of claim 6, further comprising a step of sorting the intersecting points according to their locations first in a top-to-bottom order, and then a left-to-right order.

8. The method of claim 6, wherein a small region defined by the search point and an intersecting point is a subset of a large region defined by the search point and another intersecting point, and the small region is discarded.

9. The method of claim 1, after the movable macro is packed in the feasible region, a width or a height of the movable macro is adjustably lengthened such that no narrow channel is generated in the feasible region.

10. The method of claim 1, wherein the legalizing cost function is expressed as follows:

$$\text{cost}(s) = \theta O + \mu D + \omega T + \delta C + \varepsilon W$$

where O is a total area of overlaps between any two movable macros, D is a total displacement of the movable macros, T is a thickness of the movable macros placed in the sub-region, C is a deadspace, W is a half-perimeter wirelength, $\theta$, $\mu$, $\omega$, $\delta$ and $\varepsilon$ are weightings.

11. The method of claim 1, before determining the packing sequence, further comprising a step of constructing a grid graph to record feasible placement locations in the sub-region.

12. A non-transitory computer readable medium containing program instructions causing a computer to perform the following steps:
   partitioning an entire region of a semiconductor chip into sub-regions;

determining a packing sequence of a plurality of movable macros in one sub-region of the sub-regions;

extracting search points of a plurality of placed blocks in the sub-region with respect to one of the movable macros;

determining a feasible region associated with one search point of the extracted search points;

packing said movable macro in the feasible region;

evaluating a legalizing cost function; and determining whether a value of the evaluated legalizing cost function is less than a predetermined threshold value;

wherein for every one of the placed blocks, two opposite points of the placed block are extracted, and two points that are projections of the two opposite points are further extracted.

13. The non-transitory computer readable medium of claim 12, wherein the packing sequence of the movable macros is determined by sorting the movable macros according to areas, locations and aspect ratios of the movable macros.

14. The non-transitory computer readable medium of claim 12, wherein the step of determining the feasible region comprises:

constructing at least one horizontal sweeping line that passes through a first boundary edge of every placed block and is across the sub-region horizontally;

constructing at least one vertical sweeping line that passes through a second boundary edge of every placed block and is across the sub-region vertically;

said search point moving forward vertically until being obstructed by a placed block, resulting in a first point;

said search point moving forward horizontally until being obstructed by a placed block, resulting in a second point;

obtaining intersecting points of the horizontal sweeping lines and the vertical sweeping lines within a region defined by the first point and the second point; and determining the feasible region defined by said search point and the intersecting point without encountering a placed block.

15. The non-transitory computer readable medium of claim 12, after the movable macro is packed in the feasible region, a width or a height of the movable macro is adjustably lengthened such that no narrow channel is generated in the feasible region.

16. The non-transitory computer readable medium of claim 12, before determining the packing sequence, further comprising a step of constructing a grid graph to record feasible placement locations in the sub-region.

* * * * *